Figure 1:
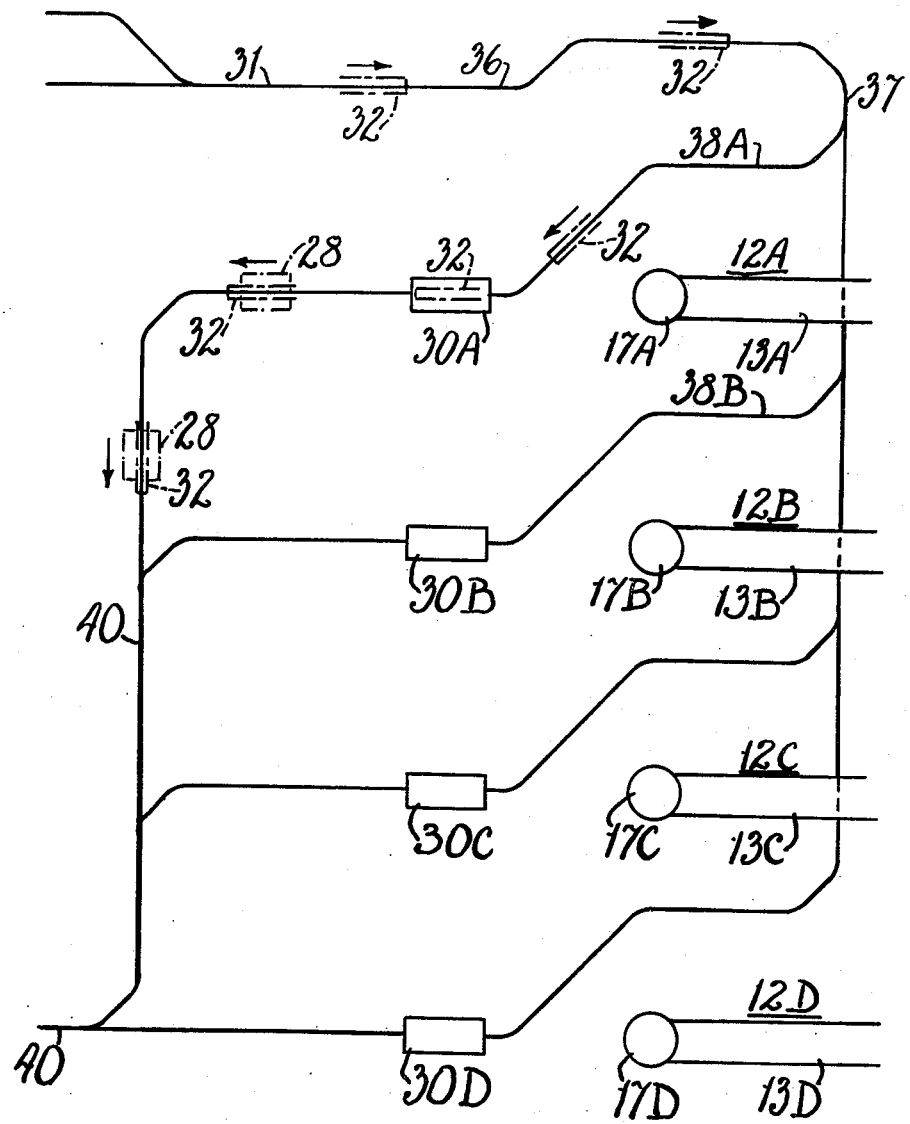

United States Patent [19]
Stubbins

[11] 3,977,224
[45] Aug. 31, 1976

[54] CONVEYING SYSTEMS
[75] Inventor: Derek Stubbins, Sheffield, England
[73] Assignee: Davy-Loewy Limited, England
[22] Filed: June 9, 1975
[21] Appl. No.: 584,979

[30] Foreign Application Priority Data
June 12, 1974 United Kingdom............... 26036/74

[52] U.S. Cl..................................... 72/201; 140/2; 242/79
[51] Int. Cl.².................... B21F 21/00; B21C 47/24; B21C 47/26
[58] Field of Search..................... 72/201, 250, 251; 140/2; 214/DIG. 3, 1 Q, 130 C; 242/79, 83; 266/3 R

[56] References Cited
UNITED STATES PATENTS

| | | | |
|---|---|---|---|
| 2,801,057 | 7/1957 | Rayburn | 242/79 X |
| 3,260,471 | 7/1966 | Crum | 242/79 |
| 3,536,274 | 10/1970 | Tommarello et al. | 242/79 |
| 3,598,251 | 8/1971 | Sieurin | 242/79 X |

Primary Examiner—Lowell A. Larson
Assistant Examiner—E. M. Combs
Attorney, Agent, or Firm—Brisebois & Kruger

[57] ABSTRACT

A rod treatment line consists of a rod conveyor on which the rod is carried in open loop form, a coil forming device for forming the rod into coils, and a coil loader for moving the coils from the coil forming device to a loading station with the axes of the coils horizontal. For removing the coils there is a conveying system consisting of a number of hooks suspended from a track, the hooks being aligned with the track and pointed in the direction opposite to the direction of movement. In order to bring the hooks to the loading station pointed towards the coil forming device, so as to facilitate loading, the track is routed in its approach to the loading station, to pass the coil forming device from the direction of the rod conveyor.

7 Claims, 3 Drawing Figures

CONVEYING SYSTEMS

This invention relates to a conveying system for rod in coil form, and is particularly concerned with a conveying system for conveying rod coils from a rod treatment line. Such a line, which will be referred to hereinafter as "a rod treatment line of the type described," consists of, in sequence, a conveyor on which the rod is carried in open loop form while subject to controlled cooling, a coil forming device for forming the rod from the rod conveyor into coils, and a coil loader for moving the coils from the coil forming device to a loading station with the axes of the coils horizontal.

For a multi-strand rod mill, the rod treatment line may be duplicated as required.

Rod coils have been previously conveyed from the loading station by hooks which are suspended from an overhead track and which are arranged transversely of the track. In that case, the track approached the loading station from the side distant from the coil forming device and then turned so that it passed through the loading station at right angles to the movement of the coil loader. When each hook was stopped at the loading station, the hook, being at right angles to the track, was pointed towards the coil loader, ready to receive a coil.

With increased weights and sizes of coils, transverse hook conveyors are becoming impractical. The necessary lengths of the coils have required greater clearances and non-uniformity of weights and sizes can cause the loaded hook, which has a single suspension point, to cant from its normal horizontal disposition, with the appendent danger of fouling equipment adjacent the track.

Conveyor systems having suspended hooks aligned with the direction of the track are known, but have not been adopted for rod treatment lines.

The hooks must travel with their free ends pointed away from the direction of movement because, with that disposition, unloading of coils from the hooks is much simplified and because collision of a coil when carried by a hook with an obstruction then results in shifting of the coil off the hook and not in stoppage of the conveyor system as a whole. If the hooks are thus pointed away from the direction of travel and the conveyor track on which they run is routed directly to the loading station, the hooks are pointed away from the coil forming device and cannot be loaded from the coil loader. Instead, the suspensions for the hooks must be designed at high expense to enable the hooks to be turned through 180° relative to the track.

The invention resides in the combination of a rod treatment line of the type described and a conveyor system for conveying coils away from the loading station, which conveying system comprises a conveying track which leads to, and away from, the loading station and which, in its approach to the loading station, passes the coil forming device from the direction of the rod conveyor, and a number of coil-supporting hooks each of which is suspended from the track and aligned with the direction of the track, and which is so pointed that, on arrival at the loading station, it is pointed towards the rod forming device.

In this way the need for turning the hooks on the tracks are avoided, the hooks, on arrival at the loading station, being already pointed in the correct direction for loading directly from the coil loader.

Preferably, and particularly when there are a number of rod treatment lines, the track extends in the direction of travel towards the rod treatment line or lines, passes under the rod conveyor or conveyors and returns to the loading station or stations. The rod conveyor or conveyors, may be modified to permit the track to pass thereunder.

Figure 2:
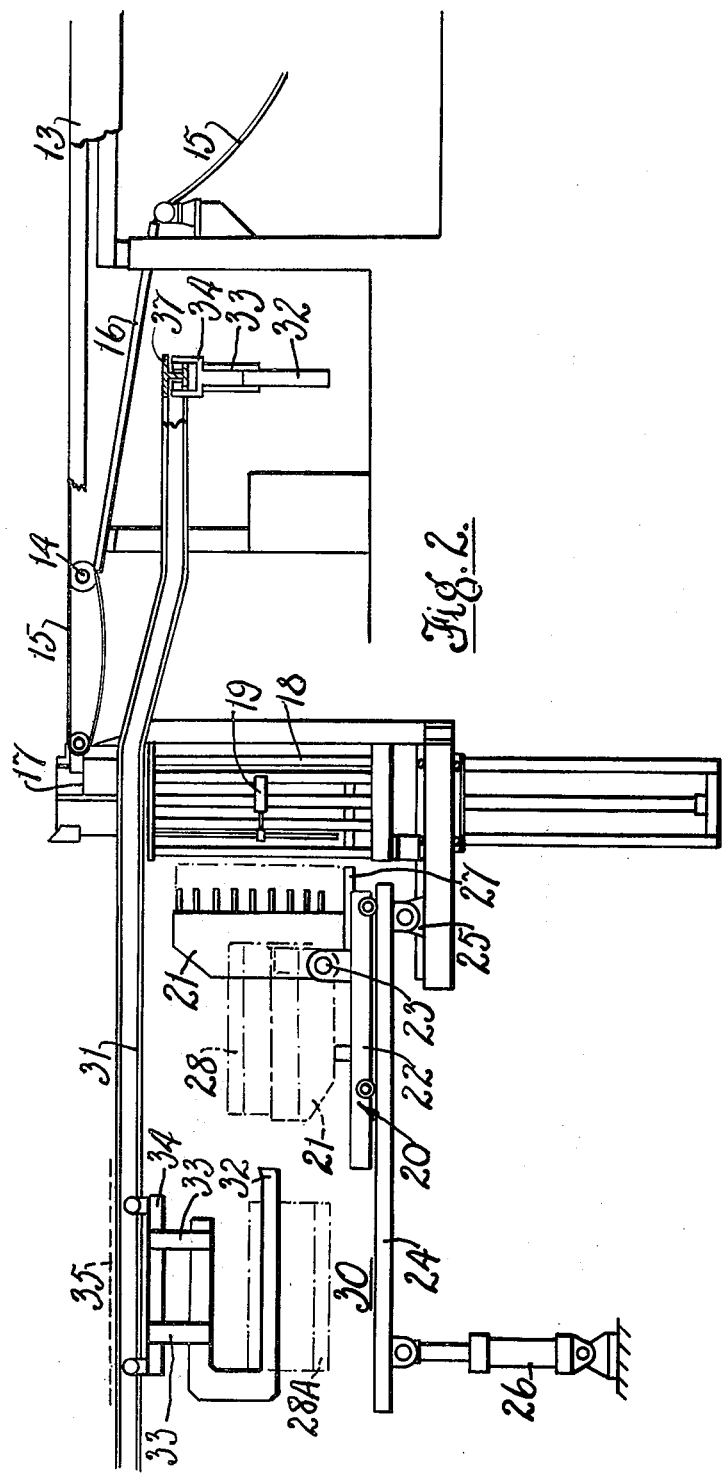
Figure 3:
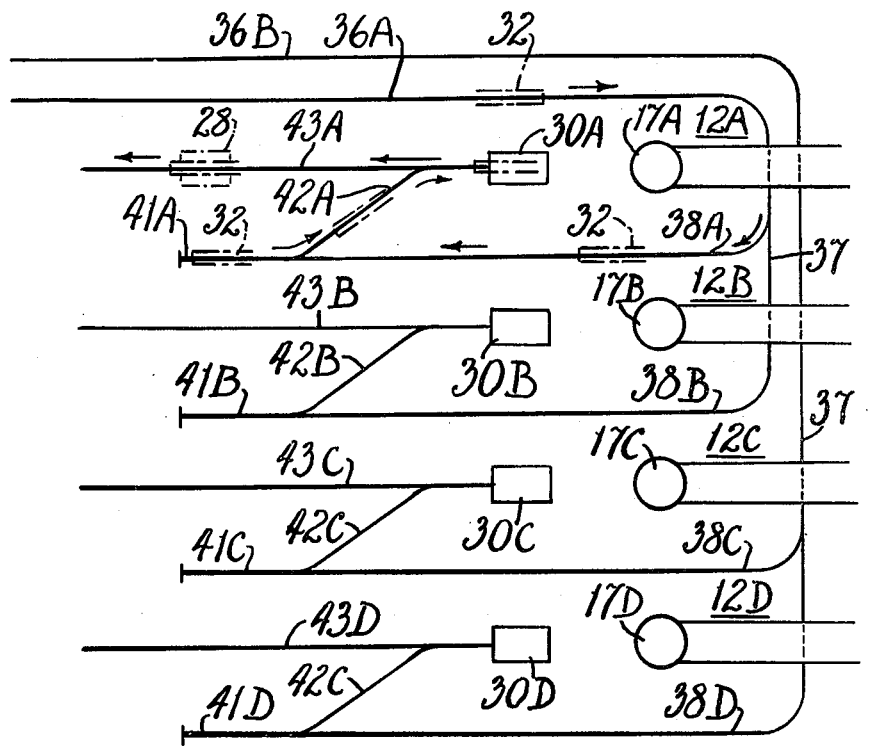

The invention will be more readily understood by way of example from the following description of a coil conveying system in accordance therewith, reference being made to the accompanying drawings, in which:

FIG. 1 diagrammatically illustrates in plan that part of the conveying system approaching and leaving the loading station of the four rod treatment lines, FIG. 2 is a side view of the end of one of the rod treatment lines, and FIG. 3 is similar to FIG. 1 and illustrates an alternative conveying system.

In FIG. 1, four rod treatment lines are illustrated at 12A – 12D, each line consisting, as shown in detail in FIG. 2, of a rod conveyor 13, on which the rod in open loop form is conveyed from right to left, while subject to controlled cooling. Each conveyor 13 ends at a sprocket wheel 14, over which the chain 15 of the rod conveyor passes, before returning through a guide tube 16 below the conveyor 13. From the end of the conveyor 13, the rod is deposited into a coil forming device 17, which is constituted by a reform tube and which is shown diagrammatically in FIG. 2. The rod coils are deposited in a cage 18; when a coil has been formed with its axis vertical, it is down-ended to bring its axis horizontal, and in the position shown in chain lines at 28 in FIG. 2. Down-ending is performed by a downender/coil loader 20 consisting of a cradle 21 which is mounted on a platform 22 by a horizontal axis 23 and which can be turned from the vertical position shown in full line to the horizontal, or down-ended, position shown in chain line. The platform 22 runs on rails 24 arranged in a direction away from the rod treatment line; the rails 24 are pivotally mounted at one end on trunnions 25 and are attached at the other end to a hydraulic piston and cylinder unit 26, by which the inclination of the rails may be varied.

When the coil has been formed, the door of the cage 18 is opened by piston and cylinder unit 19 and the cage 18 is moved horizontally until the coil is received on a platform 27 of the cradle 21. The cradle is then turned to the horizontal position, where the coil is shown in chain lines at 28, ready for moving on the rail 24 to the loading station 30.

The coil conveyor system consists of an overhead track 31 supporting a number of C-hooks, which are suspended from the track in line with the track and pointed away from the direction of movement of the hooks on the track. One of the C-hooks is shown at 32 in FIG. 2 as located at the loading station 30. Each hook 32 is attached by two links 33 to a trolley 34 which runs on the tracks 31 and which can be engaged or disengaged at will with a continuously running chain indicated schematically at 35.

The track 31 is arranged so that the unloaded hooks 32 move towards the rod treatment lines, as shown in FIG. 1, initially in a direction opposite the direction of movement of the rod on the conveyors 13, the approach line being shown at 36 as disposed to one side of the central line of the first rod treatment line 12A. The approach line 36 extends to the rear of the reform tubs 17 and falls to a level below that of the conveyors 13;

it then turns through a right angle to become a distribution line 37 which extends at right angles to the direction of movement of the rod on conveyors 13 and which passes below those conveyors (see FIG. 2). As shown, the distribution line 37 splits into four feeder lines 38A – 38D to serve each of the treatment lines 12. Each feeder line 38 branches off the distribution line 37 at a point short of the associated treatment line so as to lie to one side of the respective reform tub 17. After passing the end of the rod conveyor 13, it rises as shown in FIG. 2 to its normal level. The feeder line 38 passes to one side of the reform tub, from the direction of the treatment line, and then converges towards the centre line of the respective treatment line, in order to pass through the respective loading station 30 aligned with the direction of movement of the coil loader. As will be clear from FIG. 1, in order to reach the loading station 30B – 30D of rod treatment line 12B – 12D, the distribution line 37 passes under one or more of the rod conveyors 13. From the unloading stations 30, the tracks extend away from the rod treatment lines and are connected to a common discharge line 40 by which the coils are distributed to other parts of the plant and eventually to the discharge station.

In FIG. 1, the hooks 32, although disposed in vertical planes (see FIG. 2) are shown in plan in order to indicate the directions in which they point.

The unloaded hooks on the approach line 37 are routed to the various loading stations 30A – 30D by appropriate operation of the junctions in that line. Apart from those destined for loading station 30A, the hooks 32 pass under one or more of the rod conveyors 13 and each is brought to a stop at the required loading station 30, prior to the arrival of the coil loader 20 at that station. When a hook 32 has been brought to the position shown in FIG. 2, it is pointed towards the rear, i.e. towards the appropriate reform tub 17. The coil loader 20 then moves the down-ended coil 28 from the reform tub towards the loading station, to bring the coil onto the hook and the coil loader 20 is lowered, by operation of unit 26, until the coil is supported by the hooks 32 as shown at 28A in FIG. 2. The loaded hook is then engaged with the continuously running chain 35 and is thus moved, with its coil 28 towards the discharge line 40.

Because the track 31 extends in the rearward direction beyond the reform tubs 17 and passes under the rod conveyors 13 where appropriate, the hooks 32 can be brought to the loading stations 30 in correct disposition to receive immediately the coils 28 from the coil loaders. Without routing the track in that way, some form of complicated mechanism permitting the hooks 22 to be reversed in direction at each loading station is required.

The system described is of course applicable to conveyors other than that specifically mentioned above, in which there is a continuously running chain 35 which can be engaged or disengaged with the C-hooks. For example, the C-hooks may be carried by monorail system, with each hook carrier driven by its own electrical motor. Such a system has the advantage that each C-hook can be reversed in direction simply by reversing the electric motor and makes possible an arrangement such as shown in FIG. 3.

In FIG. 3, there are two approach lines 36A, 36B each supplying two of the rod treatment lines. The distribution lines 37 again pass under the rod treatment lines. In this case, however, each feed line 38A – 38D first passes under the associated rod treatment line and then extends parallel to the path of the associated coil loader to a siding 41 ahead of the loading station 30 and does not pass across the path of the associated coil loader 20. From the sidings 41, the C-hooks are reversed back along spurs 42 to the loading stations 30. After loading, the hook depart along the lines 43 to the common discharge line 40.

The track lay out of FIG. 3 is similar to that of FIG. 1, in that the hooks 32, in their approach paths to the loading stations 30, pass the reform tubs 17 from the direction of the rod treatment lines and arrive at the loading stations 30 pointed towards the reform tubs. However, the layout of FIG. 3 makes possible a shorter coil cycle time as the movements of the coil loaders are not interrupted and delayed by the passage of hooks along the same paths, as is the case in FIG. 1.

I claim:
1. In a rod treatment line comprising in sequence:
   a rod conveyor on which the rod is carried in open loop form while subjected to controlled cooling,
   a coil forming device for forming the rod from the rod conveyor into coils,
   a loading station,
   a coil loader for moving the coils from the coil forming device to said loading station with the axes of the coils horizontal, and
   a coil conveying system for conveying the coils away from the loading station,
   the improvement according to which said coil-conveying system comprises:
   a conveying track having a delivery portion which leads away from said loading station and an approach portion which runs from the direction of the rod conveyor past the coil forming device as it approaches said loading station, and
   a number of coil-supporting hooks, each of which is suspended from the track, aligned with the direction of the track, and so mounted that, after reaching the loading station via said approach portion, it is pointed toward the coil-forming device.

2. The combination according to claim 1, in which the conveying track passes beneath the rod conveyor in its approach to the loading station.

3. The combination according to claim 2 in which each hook is reversible in direction of movement on the track and in which the track is routed, in its approach to the loading station, to a point on the side of the station distant from the coil forming device, a switch leading back to the loading station.

4. The combination according to claim 2 in which there is at least one further parallel and similar rod treatment line and the conveyor system is branched to lead to the loading station of each line.

5. The combination according to claim 1, in which there is at least one further, similar and parallel treatment line, and the conveyor system, in its approach to the loading station, passes beneath the rod conveyor of the further treatment line, or of at least one of the further treatment lines.

6. The combination according to claim 5, in which the track includes a common delivery track and a switch or switches leading to the loading station of each of the treatment lines.

7. The combination according to claim 6, in which the tracks from the loading stations connect to a common despatch line.

* * * * *